United States Patent
Rochberger et al.

(10) Patent No.: US 6,212,188 B1
(45) Date of Patent: Apr. 3, 2001

(54) METHOD OF SOURCE ROUTING IN AN ASYNCHRONOUS TRANSFER MODE NETWORK WHEN A NODE IS IN AN OVERLOAD STATE

(75) Inventors: Haim Rochberger, Netanya; Alexander Or, Nesher, both of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/071,065

(22) Filed: May 1, 1998

(51) Int. Cl.[7] .............................. H04L 12/28; H04L 12/56
(52) U.S. Cl. ........................ 370/395; 370/400; 370/351
(58) Field of Search .................................. 370/216, 221, 370/230, 231–238, 254, 255, 351, 355, 389, 395, 400, 401, 392; 709/238–243

(56) References Cited

U.S. PATENT DOCUMENTS

| | | | |
|---|---|---|---|
| 5,291,477 | 3/1994 | Liew | 370/54 |
| 5,361,256 | 11/1994 | Doeringer et al. | 370/60 |
| 5,420,862 | 5/1995 | Perlman | 370/85.13 |
| 5,455,865 | 10/1995 | Perlman | 380/49 |
| 5,483,536 | 1/1996 | Gunji et al. | 370/85.14 |
| 5,491,690 | 2/1996 | Alfonsi et al. | 370/60 |
| 5,495,479 | 2/1996 | Galaand et al. | 370/60 |
| 5,544,327 | 8/1996 | Dan et al. | 395/250 |
| 5,550,818 | 8/1996 | Brackett et al. | 370/60 |
| 5,566,014 | 10/1996 | Glance | 359/124 |
| 5,590,118 | 12/1996 | Nederlof | 370/218 |
| 5,600,638 | 2/1997 | Bertin et al. | 370/351 |
| 5,603,029 | 2/1997 | Aman et al. | 395/675 |
| 5,613,069 | * 3/1997 | Walker | 709/238 |
| 5,629,930 | 5/1997 | Beshai et al. | 370/396 |
| 5,649,108 | 7/1997 | Spiegel et al. | 395/200.12 |
| 5,673,263 | 9/1997 | Basso et al. | 370/396 |
| 6,084,892 | * 7/2000 | Benash et al. | 370/701 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

Primary Examiner—David R. Vincent
(74) Attorney, Agent, or Firm—Howard Zaretsky; David J. Weitz; Wilson Sonsini Goodrich & Rosati

(57) ABSTRACT

A method of performing source routing when a node is in the overload state. A node in the overload state cannot perform routing functions in response to a SETUP message for destinations other than its directly connected neighbors. Instead, the node forwards the SETUP request to one of its directly connected neighbors. The neighboring node chosen must be able to support the overload routing feature, the link between the two nodes must be in the FULL state and the node chosen must not itself be in the overload state. The neighboring node chosen to calculate the source route receives a ROUTE REQUEST message encapsulating the information received from the source user. The neighboring node chosen then calculates the source route as if it was the node connected to the source user, i.e., the node in the overload state. The route, once calculated, is sent to the requesting node in the overload state.

5 Claims, 5 Drawing Sheets

METHOD OF SOURCE ROUTING IN AN ASYNCHRONOUS TRANSFER MODE NETWORK WHEN A NODE IS IN AN OVERLOAD STATE

FIELD OF THE INVENTION

The present invention relates generally to asynchronous mode transfer (ATM) networks and more particularly relates to a method of source routing while a node is in a memory overload state.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

As part of the ongoing enhancement to the ATM standard by work within the ATM Forum and other groups, the Private Network to Network Interface (PNNI) protocol has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

A high level block diagram illustrating the switching system reference model that the PNNI protocol is based on as shown in FIG. 1. The switching system, generally referenced 100, comprises a topology database 104 which interfaces with a topology data exchange module 106 within a route determination module 102. The topology data exchange module 106 communicates with neighboring nodes through a topology protocol. In addition, the switching system 100 communicates with a management entity via a management interface protocol. The switching system 100 also comprises a call processing module 124, a UNI signaling module 122 which communicates via a UNI signaling protocol, and a NNI signaling module 126 which communicates via a NNI signaling protocol. In addition, the call processing module 124 interfaces to a switching fabric 130 which provides the switching functionality for the cell stream that is input and output to and from the switching 100 system.

The PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical length becomes operational, the nodes attached to it initiate and exchange information via a well known Virtual Channel Connection (VCC) used as a PNNI Routing Control Channel (RCC).

Hello message are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledge by encapsulating information from its PTSE header within the acknowledgment packet which is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originated a particular PTSE can re-originate that PTSE. PTSEs are reissued both periodically and on an event driven basis.

A diagram illustrating the neighboring peer state machine describing the state of ongoing database synchronization and flooding with a neighboring node is shown in FIG. 2. As described previously, when a node first learns about the existence of a neighboring peer node which resides in the same peer group, it initiates the database exchange process in order to synchronize its topology database with that of its neighbors. The database exchange process involves exchanging a sequence of database summary packets which contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

The conversation that occurs between two peers for purposes of database synchronization and flooding is described by the neighboring peer state machine shown in FIG. 2. A corresponding neighboring peer data structure is maintained by the nodes located on either side of the link. The neighboring peer data structure includes information required to maintain database synchronization and flooding to neighboring peers.

With reference to FIG. 2, it is assumed that both nodes on either side of the link begin in the Neighboring Peer Down state 140. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both noes the even DropPort is triggered in the corresponding neighboring peer state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state 142 that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state 144 is entered. In this state the node describes is topology database to the neighboring peer by sending it database summary packets to it.

After the peer processes the database summary packets, the missing or updated PTSEs can then be requested. In the Exchange state 144 the database summary packets contain summaries of the topology state information contained in the node's database. In the case of logical group nodes, those portions of the topology database that where originated or received at the level of the logical group node or at higher levels are included in the database summary. The PTSP and PTSE header information of each such PTSE is listed is listed in one of the nodes database packets. PTSEs for which new instances are received after the exchanging status have been entered may not be included in any database summary packet since they will be handled by the normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state 148.

However, if the PTSE request list is not empty then the Loading state 146 is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet which contains one or more entries from the PTSE request list. The PTSE request list packets are only sent during the Exchange state 144 and the Loading state 146. The node can send a PTSE request packet to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state 146 to the Full state 148. Once the Full state has been reached, the node has received all PTSEs known to be available from its neighboring peer and links to the neighboring peer can now be advertised within PTSEs.

A diagram illustrating a PNNI topology state packet (PTSP) comprising a plurality of PNNI topology state elements (PTSEs) is shown in FIG. 3. A PTSP is made up of one or more PTSEs sequentially placed one after another as shown in FIG. 3 labeled PTSE #1, PTSE #2 all the way through the final PTSE labeled PTSE #N.

However, a potential problem may arise during the operation of a PNNI protocol based ATM network. Since each node in the PNNI based ATM network holds the entire topology of the network, including that of its peer and hierarchies, if the network grows beyond a certain size the particular node can potentially run out of memory in which to hold the topology information. This is a problem since all the nodes in the network are constructed with a finite amount of memory. This memory is used to store and forward all the PTSEs received from neighboring nodes. If a node exhausts its memory either more memory must be added, i.e., the node upgraded, or the node must be taken out of operation and upgraded with a new node containing more memory.

Once a node determines that it has run out of memory, it is defined to be in an overload state, meaning it lacks sufficient RAM for storing additional topology database information. A node in an overload state has limited switching capability and route calculations may or may not be possible. Even if routing is possible, it is not permitted in accordance with the PNNI-1 specifications. This is because it is not desirable to have a non-optimum route calculated due to the node's memory containing only a partial topology database thus making any route calculations potentially non-optimal. However, the node can function as a transit node which means it can function as a hop along the route for another node's routing list.

An overloaded node is a node that is in the overload state and, as mentioned above, cannot perform routing with the exception of local routing over direct connections to its local users. In response to entering the overload state, such a node generates and floods a PTSE which identifies itself as being in the overload state.

The prior art attempts to solve this problem include forcing the node in an overload state to advertise its condition to all other nodes, i.e., that the node is in the overload state. The node is also not permitted to function as a source node in calculating a source routing list for a path through the network to a non-local destination. The node is, however, permitted to function as a source node for routes that are local, i.e., connections to local users. In addition, in order to be removed from the overload state, the node must either be replaced with a node having more memory or modified so as to have additional memory installed in it.

Several problems exist with the prior art solutions described above. One, it is not always a simple procedure to replace or add memory to a node that already exists in the network. Such modifications typically are time consuming and thus entail taking a node down, i.e., out of service, for a certain time period. In addition, it is difficult and costly to replace switches that have been placed in operation most likely several years ago and which were constructed with less memory.

A problem arises when a node in an overload state receives a source routing request from a source user connected to the node. Since the node is in an overload state, it has only partial knowledge of the topology of the network. Although permitted, it is not preferably for a node in the overload state to perform routing functions for non-local destinations. Performing routing is not recommended because the routes a node in an overload state calculates using a partial topology database are likely to be suboptimal. This is in accordance with the current PNNI-1 standard. Only local routing may be performed by a node in the overload state.

In addition, when determining a route, a node in an overload state may not find a route to a particular destination even though a route exists in reality. This can occur when a user is connected to a node that is not in the topology database of the node in the overload state.

SUMMARY OF THE INVENTION

The present invention overcomes the problems associated with the prior art by disclosing a method of performing source routing notwithstanding the fact that a node is in the overload state. Rather than a node in the overload state performing routing functions in response to a SETUP message for destinations other than its directly connected neighbors, such a node forwards the SETUP request to one of its directly connected neighbors. The neighboring node chosen must be able to support the overload routing feature. In addition, the link between the two nodes must be in the FULL state and the node chosen must not itself be in the overload state.

Nodes that support the overload routing feature advertise this fact to their neighbors by flooding an overload routing PTSE across the network. The neighboring nodes chosen to calculate the source route receives a ROUTE REQUEST message encapsulating the information received from the source user. The neighboring node chosen then calculates the source route as if it was the node connected to the source user, i.e., the node in the overload state. The route, once calculated, is sent to the requesting node which is in the overload state. This node than attempts to follow the routing information and proceeds to route the call as if the routing had been calculated by itself.

There is provided in accordance with the present invention, in an asynchronous transfer mode (ATM) network, a method of source routing a call originating from a setup message generated by a source user connected to a first node in an overload state to a non-local destination user connected to a second user, the first node connected to a neighboring node not in an overload state via a communication link, the method comprising the steps of prioritizing a topology database memory within the first node in response to the first node discovering it is in an overload state, generating and flooding, on the first node, an overload routing message indicating to the neighbors of the first node that the first node is in the overload state, choosing at least one neighboring node connected to the first node that is not in an overload state, determining if the communication link between the chosen neighboring node connected to the first node is in a full state, determining if the chosen neighboring node connected to the first node supports overload routing, calculating a route, on the chosen neighboring node, based at least on the data provided within the setup message, transmitting the calculated route to the first node and processing the call by the first node utilizing the route calculated on the chosen neighboring node.

The method further comprises the step of transmitting a ROUTE REQUEST message from the first node to the chosen neighboring node. The method further comprises the step of transmitting a ROUTE RESPONSE message containing the results of the mute calculation from the chosen neighboring node to the first node.

The step of choosing at least one neighboring node comprises the step of choosing a neighboring node in a random fashion from all nodes immediately neighboring the first node and not in the overload state. The step of prioritizing a topology database memory comprises the step of giving priority to PTSE information from local nodes over PTSE information from non-local nodes.

BRIEF DESCRIPTION OF THE DRAWINGS

The invention is herein described, by way of example only, with reference to the accompanying drawings, wherein:

FIG. 1 is a high level block diagram illustrating the switching system architecture model that the PNNI protocol is based on;

DETAILED DESCRIPTION OF THE INVENTION

Notation Used Throughout
The following notation is used throughout this document.

| Term | Definition |
| --- | --- |
| ATM | Asynchronous Transfer Mode |
| CAC | Connection Admission Control |
| DS | Database Summary |
| DTL | Designated Transit List |
| FSM | Finite State Machine |
| ITU | International Telecommunications Union |
| NNI | Net to Network Interface |
| PNNI | Private Network-To-Network Interface |
| PTSE | PNNI Topology State Element |
| PTSP | PNNI Topology State Packet |
| RCC | Routing Control Channel |
| UNI | User to Network Interface |
| VCC | Virtual Channel Connection |

GENERAL DESCRIPTION

Figure 1:
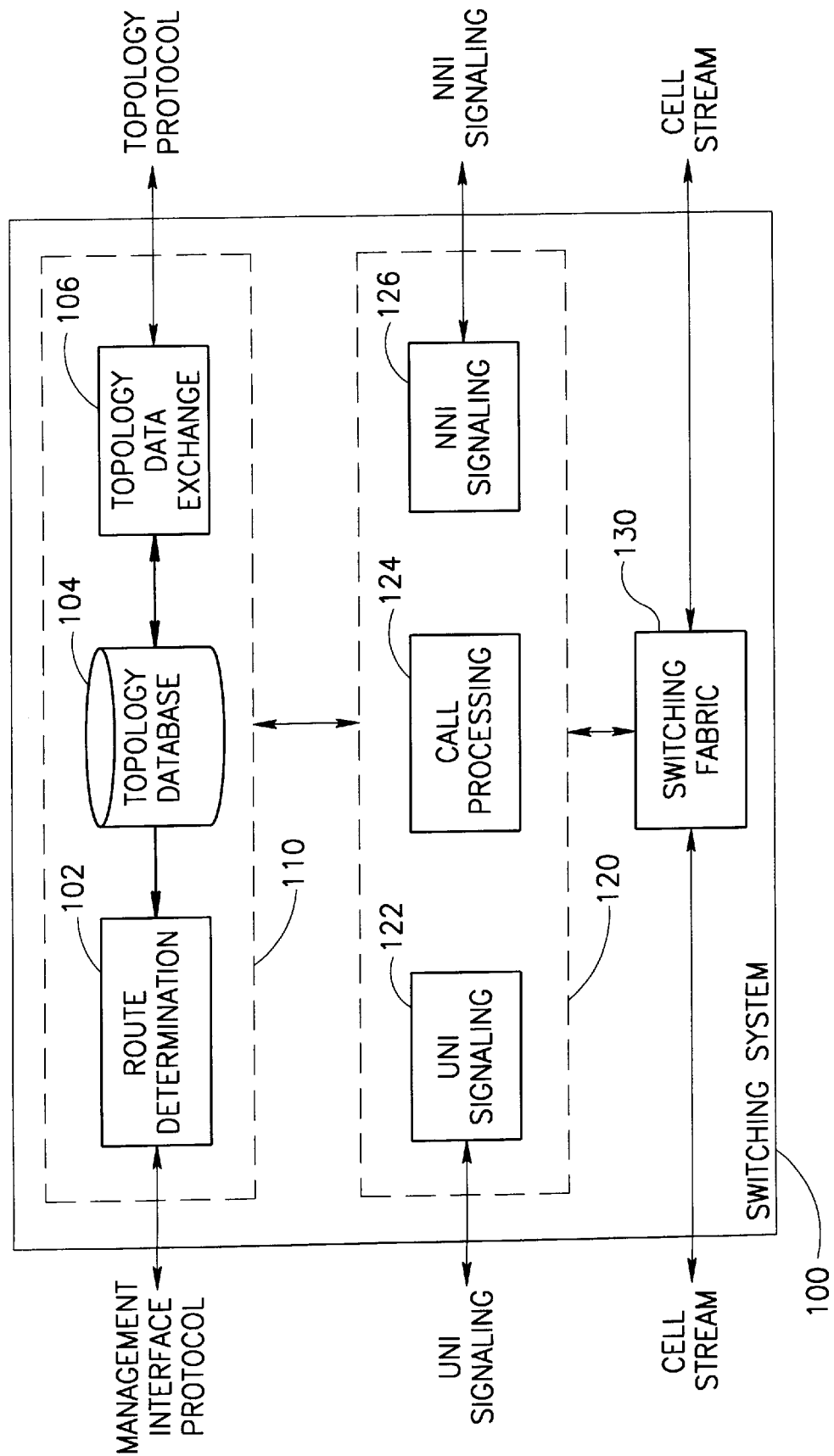
Figure 2:
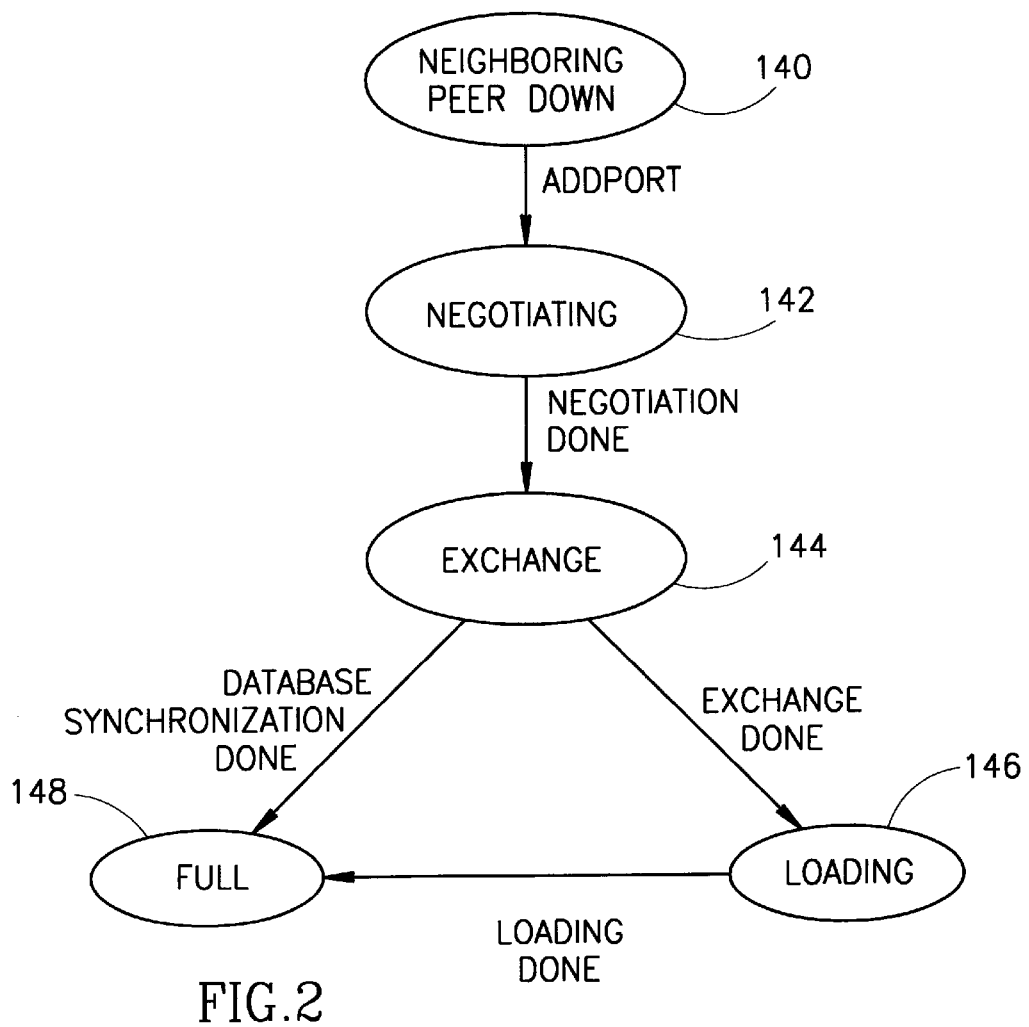
FIG. 2 is a diagram illustrating the neighboring peer state machine which describes the state of ongoing database synchronization and flooding with the neighboring node.
Figure 3:
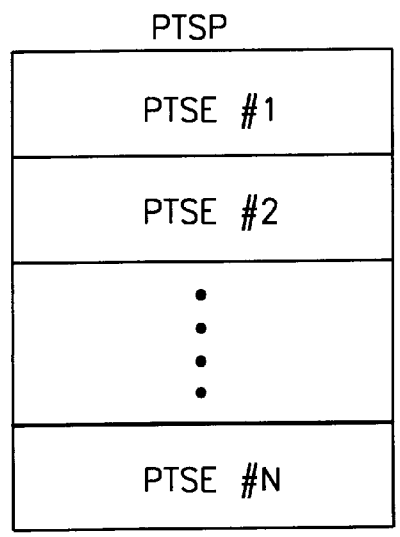
FIG. 3 is a diagram illustrating a PNNI Topology State Packet (PTSP) comprising a plurality of PNNI Topology State Elements (PTSEs)
Figure 4:
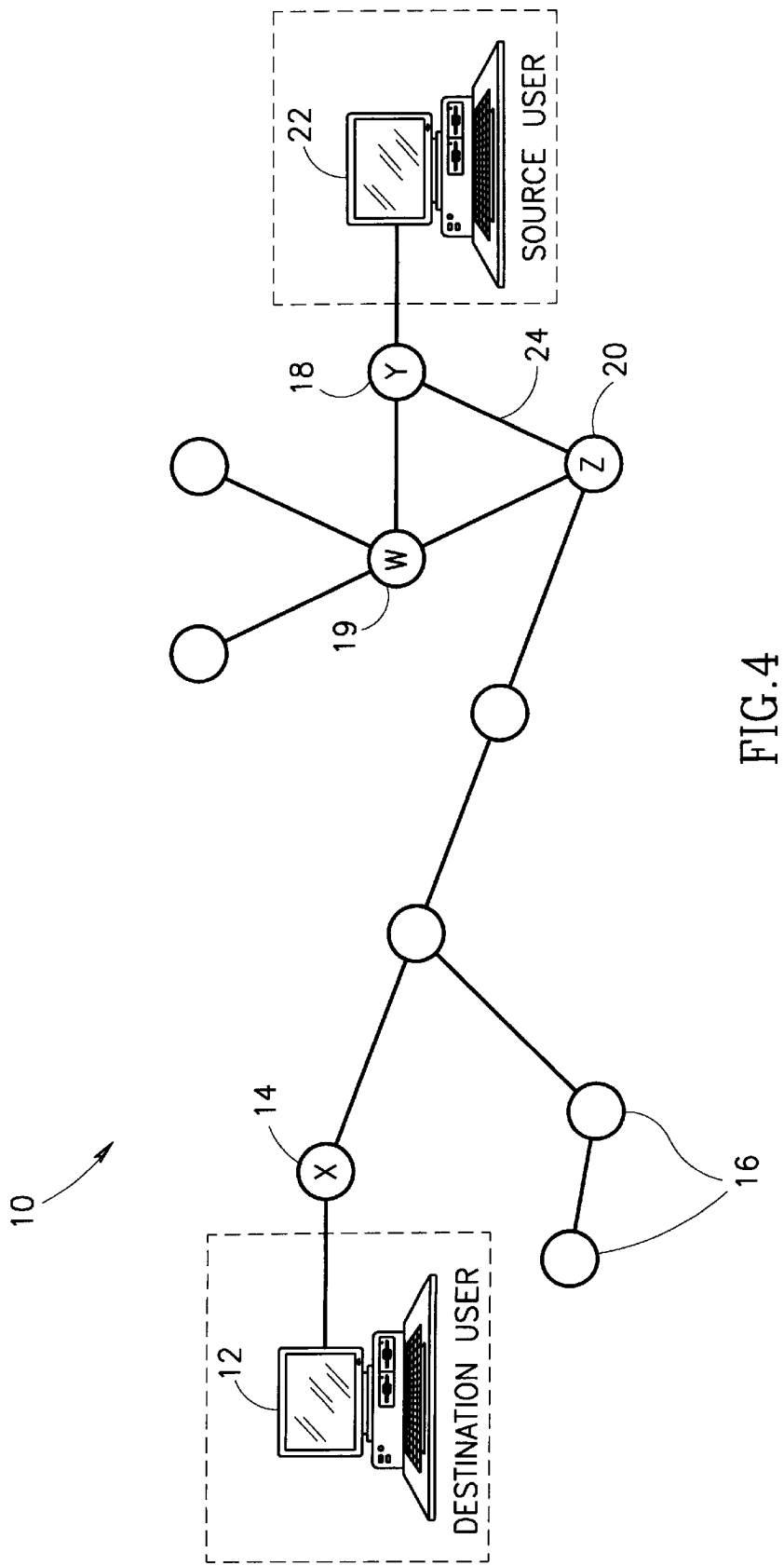
FIG. 4 is a high level block diagram illustrating an example ATM network including a source user and a destination user.

The present invention is a method of source routing in an ATM network when a node is in the overload state. Any node in an ATM network that is in the overload state can utilize the method of the present invention to perform source routing. To aid in illustrating the principles of the present invention, the method is described in the context of an example ATM network. A high level block diagram illustrating an example ATM network including a source user and a destination user is shown in FIG. 4. The network, generally referenced 10, comprises a plurality of nodes 16. A destination user 12 is connected to node X 14 while a source user 22 is connected to node Y 18. Node Y is assumed to be in the overload state. Node Z 20 is a neighbor of node Y and is connected thereto via communication link 24.

When a source user 22 requests a connection to the destination user, for example, the node it is connected to, node Y, would normally perform a source routing function to determine an optimum path to the destination node X. However, if node Y is in the overload state it is not recommended to calculate routing paths other than to directly connected neighboring nodes. Thus, without the benefit of the present invention, node Y would most likely return a suboptimal route calculation.

The principle of the present invention is that when a node in an overload state receives a SETUP request message, it forwards it to one of its neighboring nodes which is not in the overload state. The neighboring node not in an overload state then performs the route calculation as if it was the node in the overload state. In other words, the node not in an overload state starts the routing calculations using the node in the overload state as the starting node, as opposed to itself. Once the route is calculated, the node sends the route information back to the node in an overload state. Note that the route calculated is optimum since the node has full knowledge of the topology of the network since it is not in the overload state.

Figure 5:
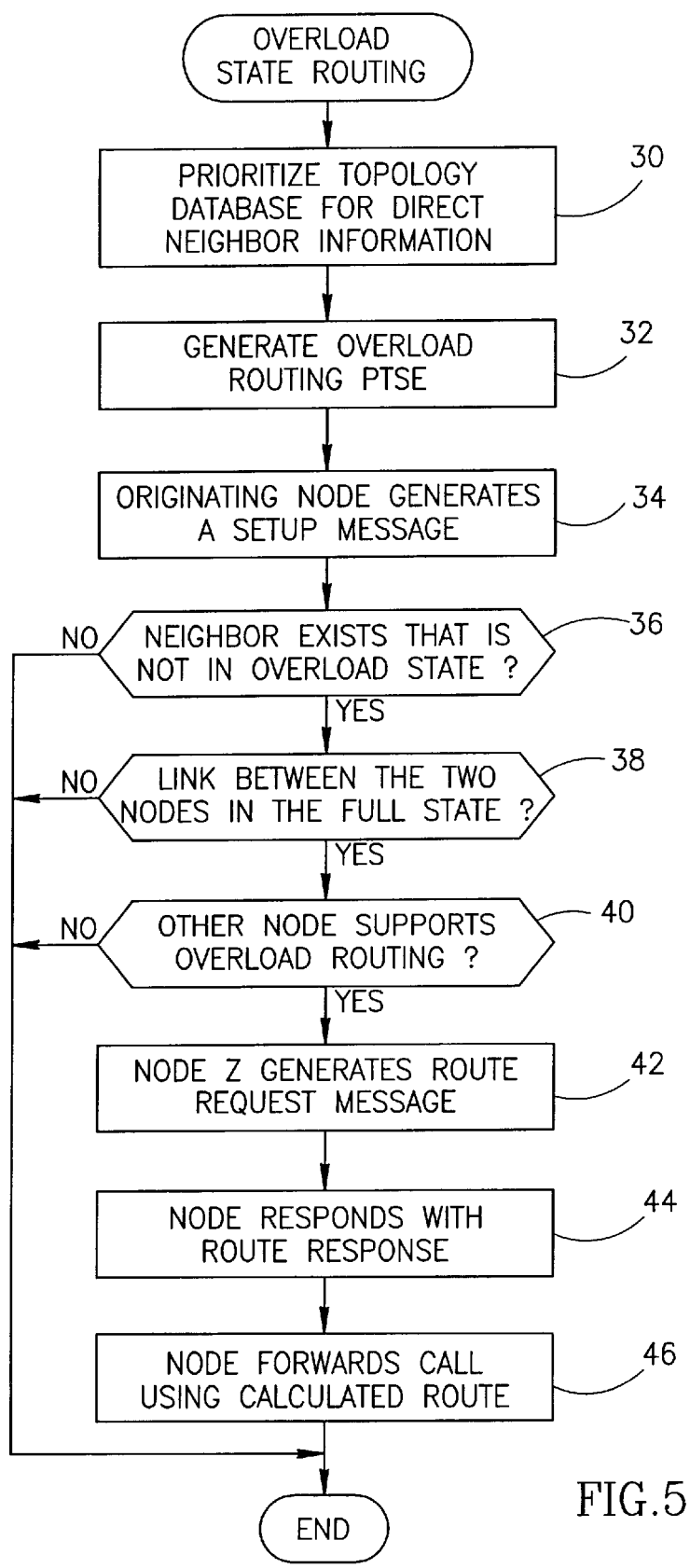
FIG. 5 is a high level flow diagram illustrating the method of source routing with a node in the overload state.

The method of source routing will now be described in more detail. A high level flow diagram illustrating the method of source routing in a node in the overload state is shown in FIG. 5. In reference to the example network of FIG. 4 and the flow diagram of FIG. 5, when a node first realizes it is in the overload state, i.e., it has exhausted its memory capacity to store additional topology information about the network, it prioritizes its entire topology database (step 30). The prioritization process comprises giving priority to PTSE information from local nodes over PTSE information from non-local nodes. Thus, if a node is in the overload state, and PTSE information from a local node arrives, the node frees up memory to store the newly received PtSE, at the expense of overwriting memory used to store PTSE information from non-local nodes. The entire topology database is prioritized. Thus, once node Y determines that it is in the overload state, it discards its entire topology database except for topology information received from its two neighbors.

In addition, before a route can be calculated, each ode that supports the overload routing feature provided by the method of the present invention, generates a PTSE indicating this fact (step 32). An overload state PTSE is a nodal PTSE having a bit indicating that the node is in the overload state. Note that the PTSE is preferably not a mandatory PTSE. Even if a node does not support the overload routing feature described herein, it still stores the PTSE, floods it to all its neighbors and also ages it, in accordance with the PNNI-1 standard as specified for unknown PTSE handling.

Now assume that the source user 22 that is connected to node Y 18 (which is in the overload state) generates a SETUP request message with a destination node that is not local (step 34). Node Y then, rather than attempting to calculate a suboptimal route since it is in the overload state, examines its topology database for neighboring nodes. The topology database includes information about its nearest low level neighbors and, memory space permitting, information about non-local nodes. In this example, node Y finds data in its topology database on nodes Z 20 and W 19 only. Of the neighboring nodes that it finds, node Y then looks for at least one neighboring node that is not in the overload state (step 36). Besides finding a node that is not in the overload state, node Y looks for the link between them to be in the FULL state as understood within the PNNI-1 standard (step 38) and looks to see if that particular node supports the overload routing function as advertised previously by its overload state PTSE (step 40).

Assuming that node Z supports the overload routing feature and node W does not, link 24 is in the FULL state and node Z is not in the overload state, node Y would then choose node Z.

At the point, node Y sends a message on link 24 to its neighbor, i.e., node Z, on a standard signaling channel, e.g., signaling VCC 0/5. The message sent by node Y is termed a ROUTE REQUEST message and comprises the SETUp message data encapsulated with a private handle in order to associate it with that particular CALL, utilizing a suitable format. Optionally, the method may be limited to point-to-point calls as the method for handling point-to-multipoint calls requires more information and is considerably more complex. The method presented herein is applicable to point-to-point calls.

The neighboring node receiving the ROUTE REQUEST message, i.e., node Z, then calculates the route based on the data it received in the ROUTE REQUEST message (step 42). Note that node Z calculates the optimum route as if it was node Y. Once the route is calculated, the node requested to calculate the route responds with a ROUTE RESPONSE message that comprises the optimum route calculated by it (step 44). In the PNNI standard, the calculated route information is termed a Designated Transit List (DTL) which represents the source route for node Y. If during the calculation no route was found, then the DTL will be empty but containing the same handle as received in the ROUTE REQUEST message.

If a route was successfully calculated and returned to node Y, node Y in turn, allocates local resources for the call SETUP, performs local Connection Admission Control (CAC) and, assuming the DTL can be followed locally, forwards the SETUP is it normally would absent being in the overload state (step 46).

Optionally, node Y starts a timer after sending the ROUTE REQUEST message. If a ROUTE RESPONSE message is received while the time is running, node Y cancels the timer. If, however, the timer expires and no ROUTE RESPONSE message is received, node Y will then send a RELEASE message back to the source user indicating that a route for that destination is not possible.

Note that nodes Y and Z in FIG. 4 can be viewed as client and server, respectively, for the purposes of route calculation. Node Z functions as a route calculation server for node Y which functions as a client requesting route calculation services from node Y.

Figure 6:
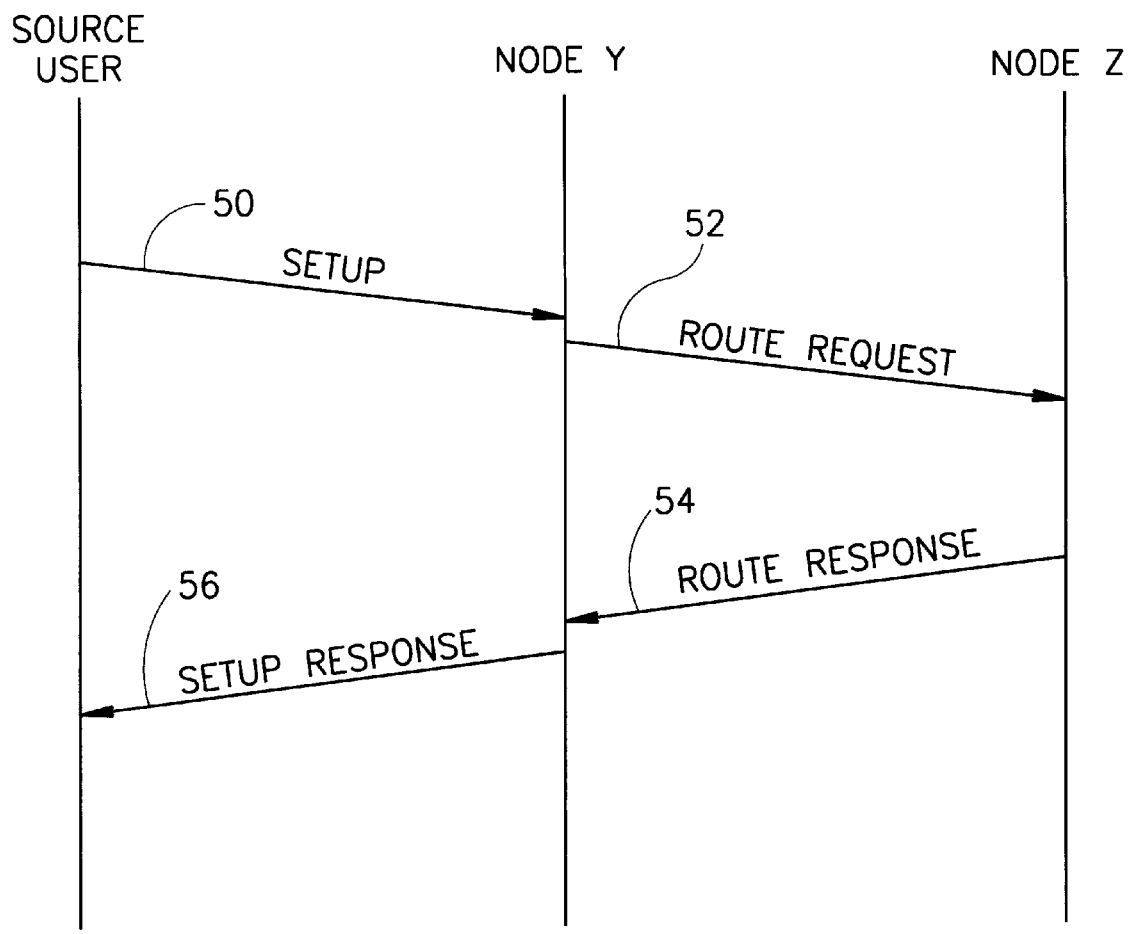
FIG. 6 is a diagram illustrating the message flow between the node in an overload state and one of its neighboring nodes.

A diagram illustrating the message flow between the node in an overload state and one of its neighboring nodes is shown in FIG. 6. The diagram shown in FIG. 6, assumes that the nodes that support the overload routing feature have previously advertised this fact by flooding their overload routing PTSE across the network. With reference also to FIG. 4, the source user begins the process by generating a SETUP message for a destination on a non load node (referenced 50). Since the source user is connected to node Y, the SETUP message is received by node Y. As described previously, since node Y is in the overload state, it is not desirable to perform source routing to non local nodes. It thus generates a ROUTE REQUEST message and transmits it to one of its neighbors (node Z) that is not in the overload state and that also supports the overload routing feature (referenced 52). Node Y sends the ROUTE REQUEST message only to a peer node that supports overload routing, the link to it is in the FULL state and the peer node is not in the overload state. Node Y encapsulates the SETUP message received into a ROUTE REQUEST message and transmits this to node Z.

Node Z then calculates an optimum route as if it was node Y. Node Z can calculate a route since it has knowledge of the full topology of the network, i.e., it is not in overload state. It then generates a ROUTE RESPONSE message (referenced 54) and sends it back to node Y. If the route calculation was successful, node Y, in turn, then sends a SETUP response message back to the source user (referenced 56).

Note that the crankback feature can also be supported by including in the ROUTE REQUEST message the crankback elements as described in the PNNI-1 standard.

While the invention has been described with respect to a limited number of embodiments, it will be appreciated that many variations, modifications and other applications of the invention may be made.

What is claimed is:

1. In an asynchronous transfer mode (ATM) network, a method of source routing a call originating from a setup message generated by a source user connected to a first node in an overload state to a non-local destination user connected to a second user, said first node connected to a neighboring node not in an overload state via a communication link, said method comprising the steps of:

prioritizing a topology database memory within said first node in response to said first node discovering it is in an overload state;

generating and flooding, on said first node, an overload routing message indicating to the neighbors of said first node that said first node is in the overload state;

choosing at least one neighboring node connected to said first node that is not in an overload state;

determining if the communication link between said chosen neighboring node connected to said first node is in a full state;

determining if said chosen neighboring node connected to said first node supports overload routing;

calculating a route, on said chosen neighboring node, based at least on the data provided within said setup message;

transmitting said calculated route to said first node; and processing said call by said first node utilizing said route calculated on said chosen neighboring node.

2. The method according to claim 1, further comprising the step of transmitting a ROUTE REQUEST message from said first node to said chosen neighboring node.

3. The method according to claim 1, further comprising the step of transmitting a ROUTE RESPONSE message containing the results of the route calculation from said chosen neighboring node to said first node.

4. The method according to claim 1, wherein said step of choosing at least one neighboring node comprises the step of choosing a neighboring node in a random fashion from all nodes immediately neighboring said first node and not in the overload state.

5. The method according to claim 1, wherein said step of prioritizing a topology database memory comprises the step of giving priority to PTSE information from local nodes over PTSE information from non-local nodes.

* * * * *